US005634649A

United States Patent [19]

Breining et al.

[11] Patent Number: 5,634,649

[45] Date of Patent: Jun. 3, 1997

[54] MEANS FOR MAKING READY TOOLS AND MATERIAL

[75] Inventors: Ralf Breining, Ostfildern; Rainer Eckert, Ludwigsburg, both of Germany

[73] Assignee: Adolf Würth GmbH & Co. KG, Germany

[21] Appl. No.: 340,118

[22] Filed: Nov. 15, 1994

[51] Int. Cl.$^{6}$ .............................. B62B 3/02

[52] U.S. Cl. .............................. 280/47.35; 280/79.11

[58] Field of Search .............................. 280/47.35, 47.34, 280/47.41, 79.11, 79.2, 79.3; 312/280, 281, 282; 248/129; 206/349

[56] References Cited

U.S. PATENT DOCUMENTS

| | | | |
|---|---|---|---|
| 3,879,053 | 4/1975 | Chvala | 280/79.11 X |
| 4,070,075 | 1/1978 | Morgan | 312/250 |
| 4,466,628 | 8/1984 | Zerver | 280/47.35 |
| 4,512,591 | 4/1985 | Plante | 280/47.35 |
| 4,641,845 | 2/1987 | Hewitt | 280/79.11 |
| 4,733,703 | 3/1988 | Cimino | 144/285 |
| 4,976,450 | 12/1990 | Ellefson | 280/79.11 |
| 5,013,055 | 5/1991 | Labrum | 280/47.19 |
| 5,048,857 | 9/1991 | Stevens | 280/651 |
| 5,083,805 | 1/1992 | Monch et al. | 280/47.35 |
| 5,280,933 | 1/1994 | Finneyfrock | 280/47.35 |
| 5,348,324 | 9/1994 | Trotta | 280/47.35 |

FOREIGN PATENT DOCUMENTS

| | | |
|---|---|---|
| 442374 | 8/1991 | European Pat. Off. . |
| 927776 | 11/1947 | France . |
| 2330508 | 6/1977 | France . |
| 2575957 | 7/1986 | France . |
| 1724796 | 6/1956 | Germany . |
| 2204595 | 8/1973 | Germany . |
| 8601410 | 4/1986 | Germany . |
| 3510307 | 9/1986 | Germany . |
| 8702845 | 6/1989 | Netherlands . |

OTHER PUBLICATIONS

ULMIA Hobelbank, Nr.2, KL, 1953.

*Primary Examiner*—Christopher P. Ellis
*Attorney, Agent, or Firm*—Quarles & Brady

[57] ABSTRACT

Apparatus for making available tools and materials contains a frame, which is formed from a lower frame element and uprights fixed thereto. Closed storage containers for tools and materials can be individually fitted to the frame. The storage containers can be matched to the specific use. The apparatus contains at least three bearing points, which are preferably formed by rolls or wheels.

21 Claims, 5 Drawing Sheets

MEANS FOR MAKING READY TOOLS AND MATERIAL

BACKGROUND OF THE INVENTION

The invention relates to a tool trolley, which is used for housing hand tools and other utensils.

Such tool or workshop trolleys are used in order to make available to a mechanic the material which he requires not only at his bench, but also at the particular location where he is working. For example, it is advantageous for a motor mechanic to have his tools available in a trolley, so that they are to hand when working on a motor vehicle.

Almost all known tool trolleys comprise randomly constructed cabinets or benches, which are rendered movable with the aid of rolls or wheels.

In a known trolley of this type (NL-A-87 02 845) a cabinet-like casing is provided with a work plate, the casing being provided with rolls, which are fitted laterally to the walls of the cabinet. The cabinet also has a handle for its movement.

In another known trolley of this type (U.S. Pat. No. 40 70 075) the cabinet contains a frame formed from angle sections, to which are fixed the side walls, doors and wheels.

Another known storage means for tools and small parts contains a cabinet screwed together from several containers and which is placed on a plate provided with rolls.

Although all these means are suitable for a specific application for which they were designed, it is scarcely possible to adapt them to other functions.

In order to render tool trolleys usable for different functions, it has already been proposed (EP-A-442 374), to manufacture the tool trolley from two juxtaposed cabinets having different heights and to provide a chassis formed by a plate. One of these cabinets is constructed as a drawer cabinet for standard selection cases, so that the latter can be interchanged for adapting to a different use. However, the basic structure of the tool trolley cannot be changed.

SUMMARY OF THE INVENTION

The problem of the invention is to provide a universally usable means for making ready tools and/or material, which in the case of a stable construction permits an easy adaptation of the means and its construction to different uses.

According to the invention this problem is solved by the means having the features of claim 1 and further developments form the subject matter of subclaims.

Whereas all known tool trolleys of this type are designed according to the principle of providing a stable cabinet or a miscellaneous stable casing with wheels, so that the content can be replaced, the invention takes a new line. It constructs the means from a frame structure, which not only forms the actual chassis, but also has uprights, which extend upwards. The individual storage parts are fitted and fixed to said uprights. The means consequently receives its stability through the frame structure, so that the storage elements need only have an adequate stability for itself. This ensures that the means is made very stable and, despite the ease of replacement, the weight is kept low.

It is possible to combine the most varied types of storage cases with a different capacity with the frame structure, so that beth from the manufacturing standpoint and from the use standpoint a plurality of different means can be combined.

The lower frame element, which forms a type of chassis, can e.g. be formed in that the longitudinal member interconnects the two transverse members and roughly centrally engages thereon. This leads to a type of double T.

It is also possible for the lower frame element to have two longitudinal members, which connect the two transverse members. They can e.g. act on the ends of the transverse members, so that a normally rectangular frame is formed.

It is also possible for the lower frame element to comprise an integrated module formed from a storage case and longitudinal member.

According to a further development of the invention, in each case one upright can be fitted to each transverse member. It can e.g. be fitted centrally to the transverse member. This embodiment is particularly advantageous if the tool trolley is relatively narrow, so that one upright can be sufficient.

However, it is also advantageously possible for the upright to be fitted at one end of the transverse member. Thus, on beth transverse members the upright can be fitted to the same transverse member end.

However it is also possible to fit the two uprights to opposite ends of the particular transverse member.

It is obviously also possible to use three or four uprights and in the case of four uprights they are advantageously in each case fitted to the ends of the transverse member. Such a construction is advantageous with very heavy and possibly also very wide workshop trolleys.

The two uprights are advantageously parallel to one another. In this case the elements to be fitted to the uprights can be fitted at different heights, which permits easy reciprocal interchangeability of the different elements.

It is possible and is proposed by the invention that the uprights are inclined. This can be advantageous if the arrangement of the storage cases is to diverge from the vertical.

In order to be able to more easily handle the means, the invention proposes that it be provided with a handle. Advantageously the handle acts on the frame, i.e. in particular on an upright and can be adjusted by a corresponding connecting element along the frame cross-section.

According to a further development of the invention, the means has a setting-down surface. The latter can either be formed on a top surface of a storage container or as a separate element. In the latter case, according to the invention, said separate element can again be connected to the frame and is fixable thereto, advantageously once again with an upright and can be adjusted by means of a corresponding connecting element along the frame cross-section.

According to a further development the means can have a working surface, which is in particular positioned in the vicinity of the top of the frame. It can also be a working surface for heavy objects, because as a result of the construction from a frame the means is very stable.

According to a further development a functional element can be fitted to the frame, e.g. a mirror, a lamp, a bracket arm or a gripping arm for a tool. It is also possible to simultaneously fit several functional elements.

On the frame can be fitted a functional element with a working machine, e.g. a circular saw or drill.

According to a further development of the invention, the storage containers and/or the containers for the working machine can be placed in and optionally fill the space between the uprights. It is particularly favourable if several superimposed containers are fixed to the frame.

Conventionally the means has an elongated shape, the end faces being formed by the transverse members. The invention now proposes the fitting of additional elements to the frame end faces and which are consequently located outside the uprights. These can be parts which take up less space. These parts can optionally be easily removable and for this purpose have handles.

Further features, details and advantages can be gathered from the claims, whose wording is incorporated into the content of the description, the following description of a preferred embodiment and the attached drawings, wherein show:

DETAILED DESCRIPTION

Figure 1:
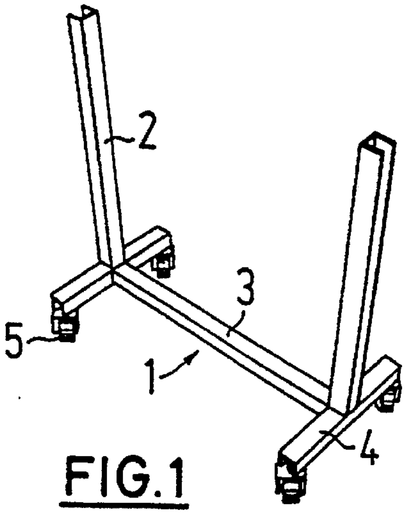
FIG. 1 A tool trolley having two uprights.
Figure 2:
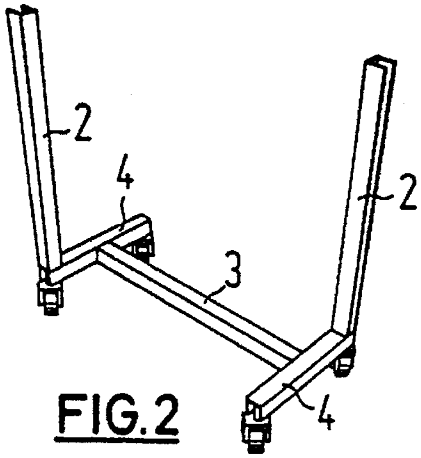
FIG. 2 A tool trolley having two uprights alternatively positioned.

The tool trolley frame illustrated by different variants in FIGS. 1 to 6 contains a lower frame element 1, to which are fitted at least two and optionally also four upwardly, freely projecting uprights 2.

In the embodiments according to FIGS. 1 to 5 the lower frame element 1 in each case contains a longitudinal member 3, to whose two ends is in each case fixed a transverse member 4. As a result the longitudinal member 3 and the two transverse members 4 form a double T. Normally the longitudinal member 3 engages centrally on the transverse members 4. On all the ends of all the transverse members 4, a normally swivellable roll 5 is fitted to the underside.

In the embodiment according to FIG. 1 both uprights 2 are centrally fitted to the transverse members 4 and extend parallel upwards and e.g. have the shape of a U-section.

Figure 3:
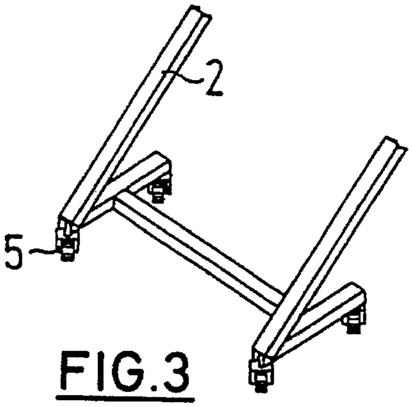
FIG. 3 A tool trolley having two uprights alternatively positioned.
Figure 4:
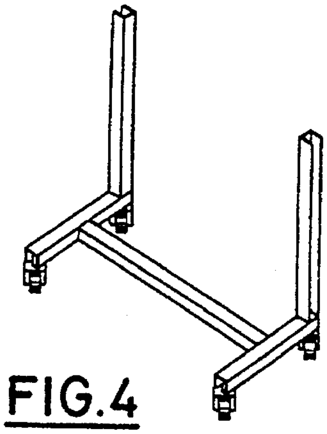
FIG. 4 A tool trolley having two uprights alternatively positioned.

In the embodiment according to FIG. 3 the two uprights 2 are in each case fixed to one end of a transverse member 4, namely to opposite ends thereof. The possibility of fitting the two uprights 2 to in each case the same end of the transverse member 4 is illustrated in FIGS. 3 and 4. Whereas in the embodiment according to FIG. 4 the uprights 2 extend vertically upwards, i.e. perpendicular to the surface on which the trolley is standing, in the embodiment according to FIG. 3 the uprights 2 extend upwards in sloping manner. This can e.g. be used for a workshop trolley, in which the storage containers or cases to be fitted also diverge from the perpendicular.

Figure 5:
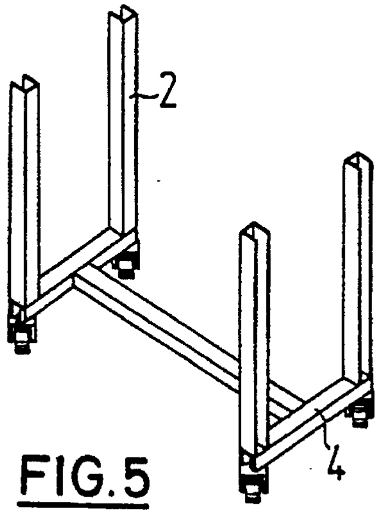
FIG. 5 A tool trolley having four uprights.

In the embodiment according to FIG. 5 four uprights 2 are provided and are in each case fixed to the ends of the transverse member 4 of the lower frame element 1. This type of frame is preferred in the case of tool trolleys, which have a certain width.

Figure 6:
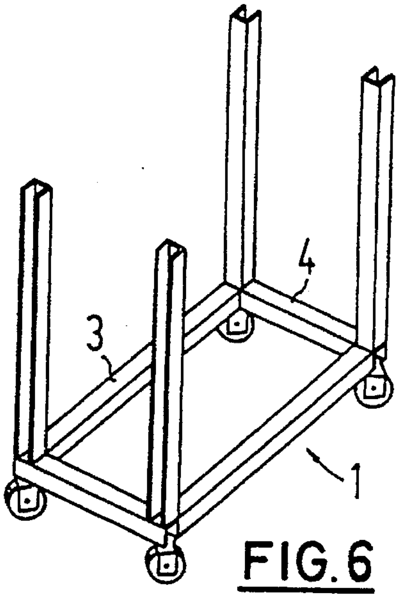
FIG. 6 A tool trolley having four uprights with a modified lower frame construction.

In the embodiment according to FIG. 6 the lower frame element 1 is formed by two longitudinal members 3 and two transverse members 4. At their ends the longitudinal and transverse members are connected to one another and to the uprights 2. This frame is particularly stable and is in particular suitable for workshop trolleys which are to be heavily loaded.

Figure 7:
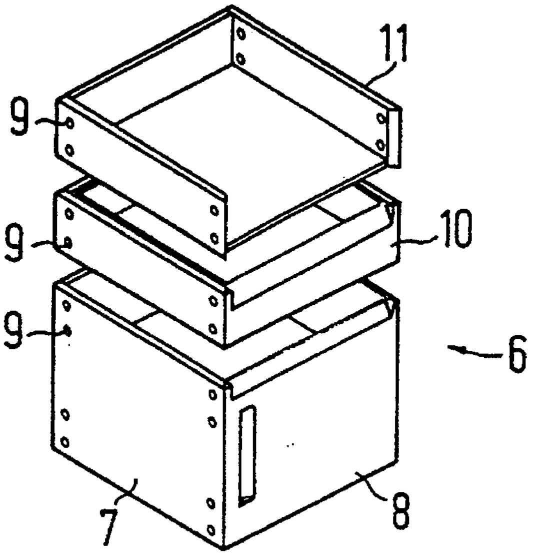
FIG. 7 Three storage containers for a tool trolley.
Figure 8:
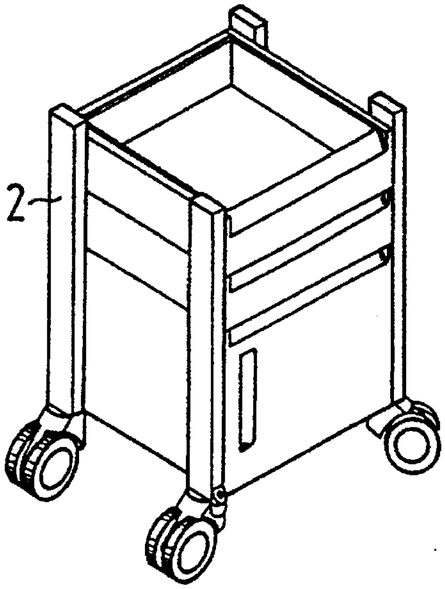
FIG. 8 A tool trolley with the parts of FIG. 7 in the semifinished state.
Figure 9:
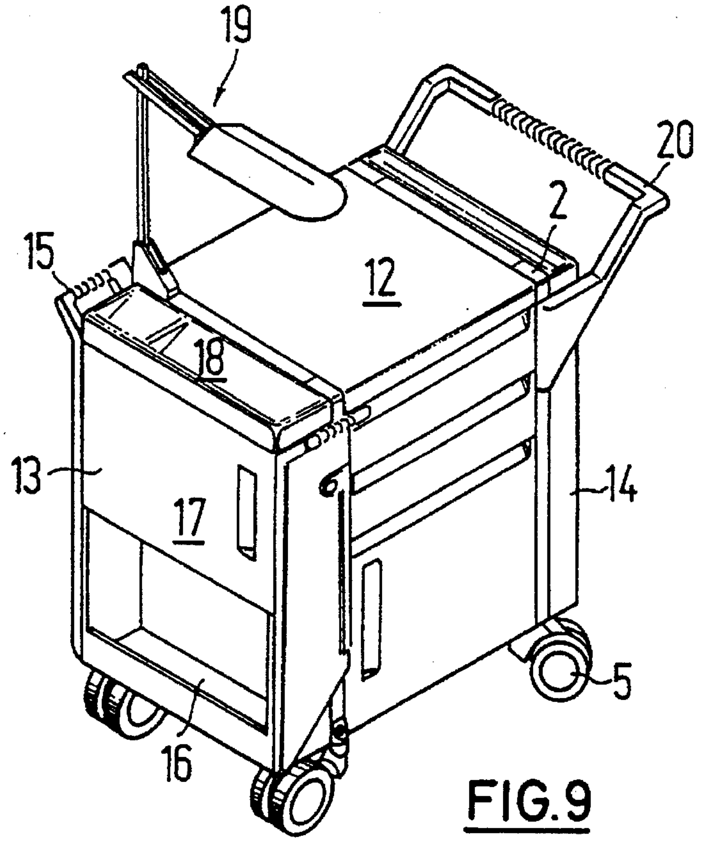
FIG. 9 The complete tool trolley with the elements of FIG. 7.

Whilst FIGS. 1 to 6 show the basic construction possibilities for the frame, FIGS. 7 to 9 show the construction of a specific workshop trolley, which uses the frame configuration of FIG. 5.

FIG. 7 shows several storage containers 6 which are to be housed in the frame. As the lower storage container 6 is provided a cabinet compartment 7, which can be closed at the front by a door 8. On the side walls of the cabinet compartment 7 are provided bores, with the aid of which the said compartment can be firmly screwed to the uprights 2. Above the cabinet compartment 7 there is a drawer compartment 10, whose side walls are also provided with bores 9.

Above the drawer compartment 10 is shown an open compartment 11, whose side walls are once again provided with bores 9. These three storage containers are now connected to the frame uprights 2, so that the configuration according to FIG. 8 is obtained. Connection takes place e.g. by screw fastening. In FIG. 8 a drawer is also inserted in the open compartment 11. FIG. 8 shows a movable tool trolley, which can be extended by further elements. It is obviously also possible to fix the storage container 6 of FIG. 7 in a different order to the uprights 2.

FIG. 9 shows the completed tool trolley. At the top it is closed by a work plate 12, which closes the top of the upper drawer compartment 11 and forms a stable working surface. The work plate 12 is connected and in particular screwed as a component to the uprights 2.

As can be gathered from FIGS. 8 and 9, the storage containers 6 shown in FIG. 7 are placed in the space between the uprights 2 and completely fill the said space. The end faces of the tool trolley, which are still free in FIG. 8, are now occupied by additional elements 13, 14. The additional element 13 of FIG. 9 is constructed as a complete element and has two handles 15 with which it can be removed again. In the represented embodiment the additional element 13 contains in the lower area an open compartment 6 and in the upper area a compartment closed by a door 17. The top of the additional element 13 is formed by a setting-down tray 18, which can have depressions, so that objects can be placed in it.

To one upright 2 is fixed a letup 19. An electrical connection can be provided in the tool trolley.

On the opposite side, shown to the rear right in FIG. 9, the tool trolley is provided with a bow-shaped handle 20, which is fixed to the frame uprights 2.

The stability of the tool trolley is ensured by the actual frame, so that the individual storage cases can be closed and do not have to assume any carrying functions.

Figure 10:
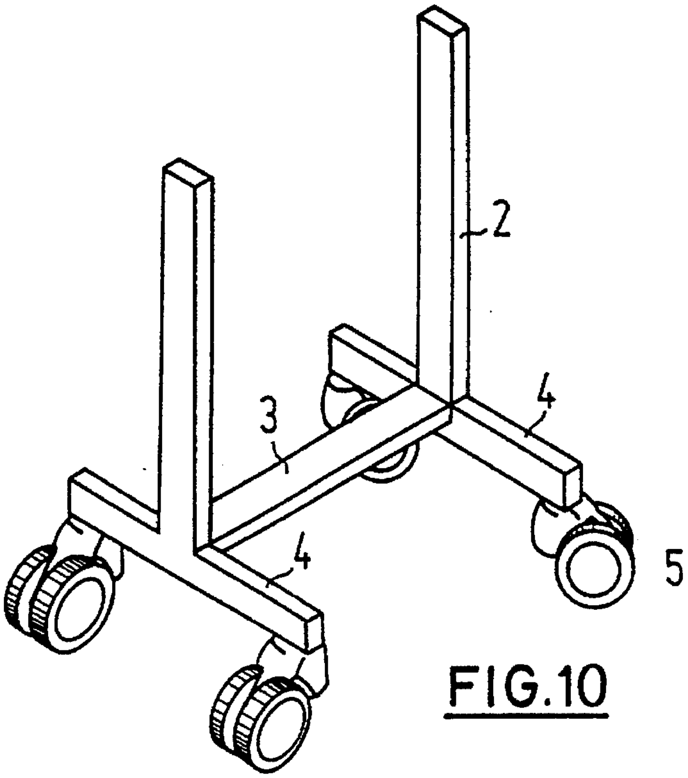
FIG. 10 A further frame for a tool trolley.
Figure 11:
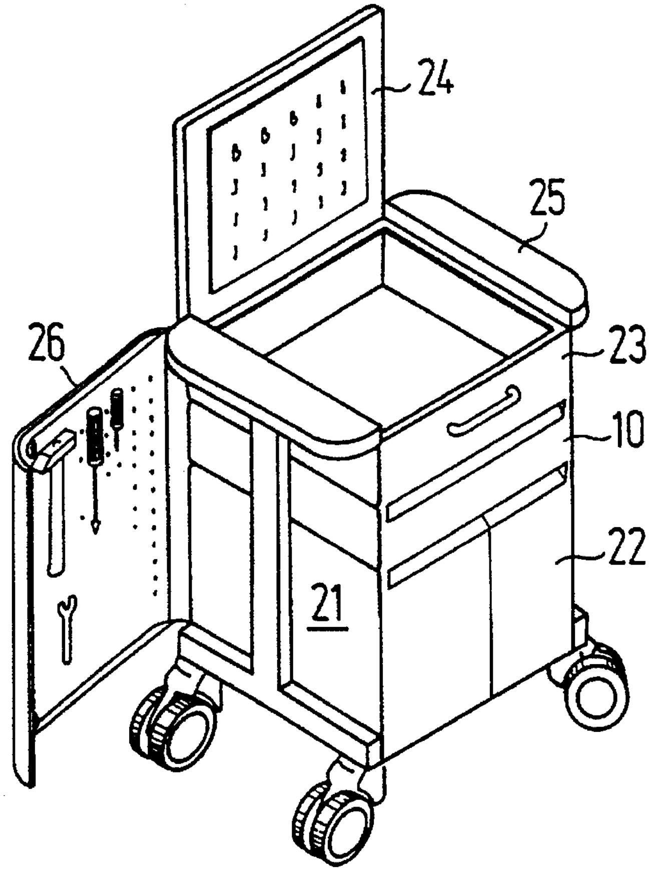
FIG. 11 A tool trolley using the frame of FIG. 10.

FIG. 10 shows an embodiment of a frame with the basic configuration of FIG. 1. The parts forming the longitudinal and transverse members and the uprights 2 are constructed as rectangular sections. All the rolls 5 are casters. Once again storage containers are inserted in and fixed to the said frame, so that a construction as shown in FIG. 11 is obtained. At the bottom point, i.e. resting directly on the longitudinal member 3, is provided a cabinet compartment 21 with a double door 22, over which is placed a drawer compartment 10.

In the space between the two uprights 2 and above the drawer compartment 10 is inserted a tool case 23, which can have a fold-up lid 24. The lid 24 is constructed in such a way that in the closed state it is aligned with lateral setting-down surfaces 25, which are fixed to the upper ends of the uprights 2. The left-hand, front terminal edge in FIG. 11 has a door flap 26, to whose inside are fixed individual tools. A similar or different device can also be fitted to the facing end side.

Figure 12:
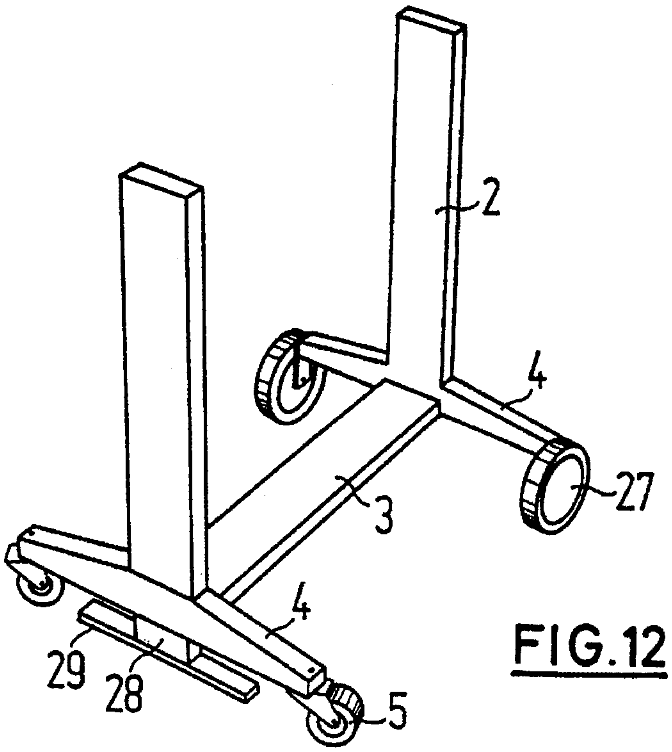
FIG. 12 A further example for a frame.

FIG. 12 shows a frame similar to FIG. 10 and which contains one longitudinal member 3 and two transverse members 4. Centrally with respect to the transverse members 4 are provided uprights 2, which can also be in one piece with the transverse members 4. To one transverse member 4 are fitted two non-swivellable wheels 27, whereas two casters 5 are located on the other transverse member 4.

On the underside of the front, left-hand transverse member 4 in FIG. 12 is placed a lowerable upright 28. On its underside it contains a plate 29 extending between the two casters 5 for resting on the ground. The upright 28 can be lowered with respect to the frame, so that it is possible to stop in fixed manner a workshop trolley provided with the frame of FIG. 12.

Figure 13:
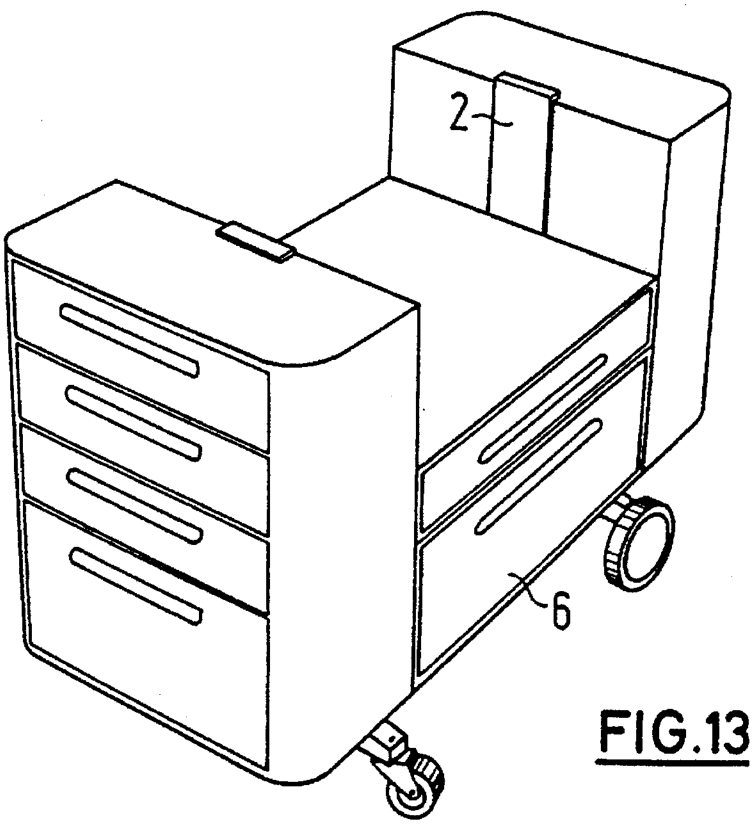
FIG. 13 A tool trolley with the frame of FIG. 12.

FIG. 13 shows an example for a tool trolley provided with the frame of FIG. 12. Once again in the space between the two uprights 2 there are several storage containers 6, in this case having drawers. Further elements are fitted to the two end faces. In the space left between the uprights 2 it is e.g. possible to house a case with a circular saw located therein. The top of this plate would then be aligned with the tops of the two additional elements. Thus, it is possible with the tool trolley according to the invention to house therein cases containing working machines. The frame is sufficiently stable that the tool trolley can even serve as a work bench.

Figure 14:
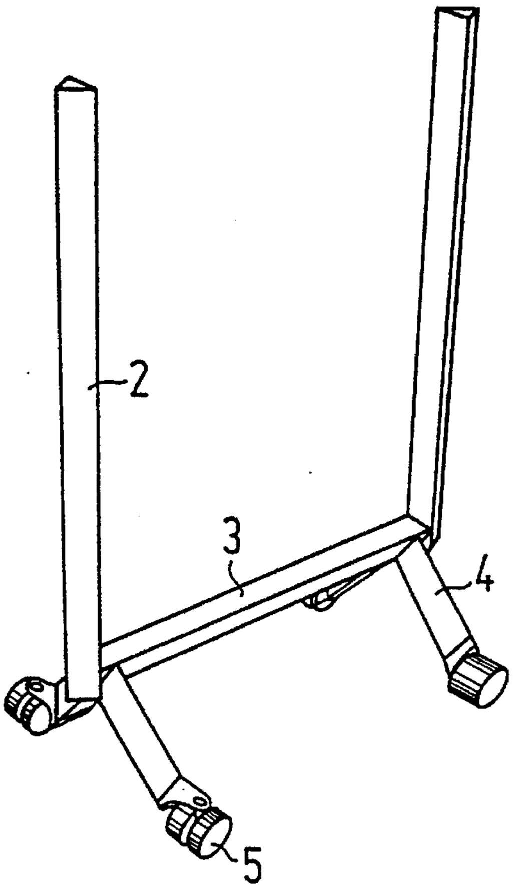
FIG. 14 A modified frame similar to FIG. 12.
Figure 15:
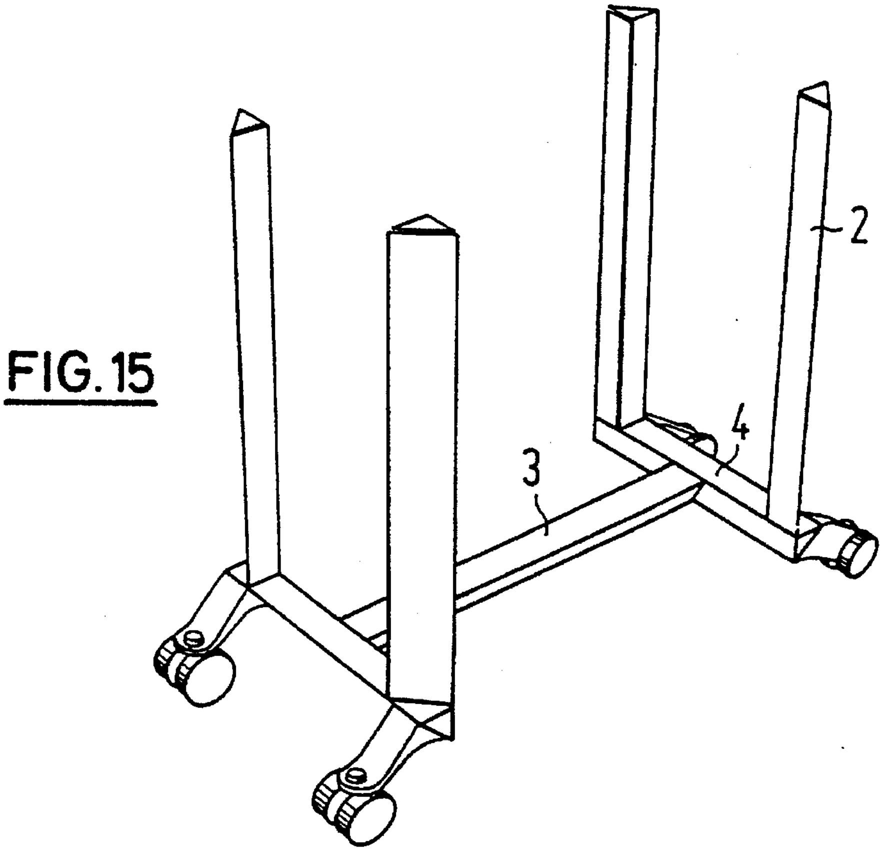
FIG. 15 A modified frame having four uprights.

FIGS. 4 and 15 show further frames corresponding to the basic configurations of FIGS. 1 to 5. In the embodiment according to FIG. 14 the lower frame element is formed by a longitudinal member 3 and transverse members 4, which in the represented case are in two parts, so that they appear angled. Once again there are fixed or swivellable rolls 5. In the embodiment according to FIGS. 14 and 15 the longitudinal members 3 and transverse members 4 are constructed from cross-sectionally triangular sections, said sections also being usable for the uprights 2. Once again it is possible to fit the most varied housing cases and working means.

We claim:

1. Apparatus for making available tools comprising:

a tool trolley having a plurality of storage containers which are interchangeably arranged one to another; and a frame having a lower frame element and at least two uprights fixed to the lower frame element and projecting upwards therefrom, said tool trolley being inserted within said uprights and affixed thereto.

2. Apparatus according to claim 1, wherein the lower frame element has at least one longitudinal member and at least two transverse members lying in a horizontal plane.

3. Apparatus according to claim 2, wherein the longitudinal member of the lower frame element interconnects the two transverse members centrally thereto.

4. Apparatus according to claim 2, wherein the lower frame element has two longitudinal members interconnecting the two transverse members.

5. Apparatus according to claim 1, wherein the lower frame element is formed by one of said storage containers containing the longitudinal and transverse members.

6. Apparatus according to claim 2, wherein each upright is fitted to each transverse member.

7. Apparatus according to claim 2, wherein one of said uprights is centrally fitted to one of said transverse members.

8. Apparatus according to claim 2, wherein one of said uprights is fitted to one end of one of said transverse members.

9. Apparatus according to claim 1 with at least one handle fixable to the frame.

10. Apparatus according to claim 9, wherein the handle is constructed displaceably in the longitudinal direction of the frame to which it is fixed.

11. Apparatus according to claim 1 with at least one horizontal setting-down surface.

12. Apparatus according to claim 1 with at least one working surface, which is arranged in the vicinity of the top of the frame and is fixed thereto.

13. Apparatus according to claim 1 with at least one functional element fittable to the frame.

14. Apparatus according to claim 1 with at least one working machine fittable to the frame.

15. Apparatus according to claim 1 with additional parts fittable to end faces of the frame outside the uprights.

16. Apparatus according to claim 1 with a locking device for fixing the trolley.

17. Apparatus according to claim 1, wherein members of the lower frame element and the uprights are made from metallic profiles.

18. Apparatus according to claim 1, wherein at least one bearing point of the lower frame element has a roll or a wheel.

19. Apparatus according to claim 1 with four uprights fitted to the corners of the lower frame element.

20. Apparatus according to claim 1, wherein the uprights are parallel to one another.

21. Apparatus according to claim 1, wherein the uprights are inclined.

* * * * *